United States Patent
Araki et al.

(10) Patent No.: US 9,739,671 B2
(45) Date of Patent: Aug. 22, 2017

(54) PRESSING FORCE SENSOR

(71) Applicant: MURATA MANUFACTURING CO., LTD., Nagaokakyo-shi, Kyoto-fu (JP)

(72) Inventors: Keisuke Araki, Nagaokakyo (JP); Hideki Kawamura, Nagaokakyo (JP); Jun Endo, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 345 days.

(21) Appl. No.: 14/596,381

(22) Filed: Jan. 14, 2015

(65) Prior Publication Data
US 2015/0192482 A1   Jul. 9, 2015

Related U.S. Application Data

(63) Continuation of application No. PCT/JP2013/069709, filed on Jul. 21, 2013.

(30) Foreign Application Priority Data

Jul. 26, 2012 (JP) .................................. 2012-165735

(51) Int. Cl.
G01L 1/04 (2006.01)
G01L 1/16 (2006.01)
(Continued)

(52) U.S. Cl.
CPC ............... G01L 1/16 (2013.01); G01L 1/205 (2013.01); G01L 1/225 (2013.01); G01L 1/2287 (2013.01); G01L 5/0038 (2013.01)

(58) Field of Classification Search
CPC . G01L 1/16; G01L 1/205; G01L 1/225; G01L 1/2287; G01L 5/0038
(Continued)

(56) References Cited

U.S. PATENT DOCUMENTS 7,362,225 B2 *  4/2008 Rittmueller ......... B60R 21/0152
                                                  324/207.15
2007/0068720 A1 *  3/2007 Fischer .................. B60N 2/002
                                                  180/273
(Continued)

FOREIGN PATENT DOCUMENTS

JP   2000-275114 A   10/2000
JP   2000-337971 A   12/2000
(Continued)

OTHER PUBLICATIONS

International Search Report for PCT/JP2013/069709, date of mailing Aug. 20, 2013.
(Continued)

*Primary Examiner* — Max Noori
(74) *Attorney, Agent, or Firm* — Arent Fox LLP

(57) ABSTRACT

A pressing force sensor that includes a sensor element configured with a piezoelectric film, a lead terminal for connection to an external circuit, a wiring conductor which connects pressing force detection electrodes and the lead terminal, and a flexible printed circuit board which withstands solder reflow temperatures. The flexible printed circuit board has the pressing force detection electrodes formed on a first principal surface thereof, and is folded via a folding line while the first principal surface faces inward. The sensor element is deflected by a pressing force applied to a second principal surface which faces outward and is in a first area of the flexible printed circuit board which is on one side with respect to the folding line, and a signal corresponding to the pressing force is thus taken out from the pressing force detection electrodes.

14 Claims, 7 Drawing Sheets

(51) Int. Cl.
 *G01L 1/22* (2006.01)
 *G01L 5/00* (2006.01)
 *G01L 1/20* (2006.01)

(58) Field of Classification Search
 USPC .................................. 73/760, 777, 862.627
 See application file for complete search history.

(56) References Cited

U.S. PATENT DOCUMENTS

| | | |
|---|---|---|
| 2010/0253183 A1 | 10/2010 | Ando et al. |
| 2012/0074961 A1* | 3/2012 | Herrmann ............... G06F 3/044 |
| | | 324/658 |
| 2012/0075226 A1 | 3/2012 | Andoh |
| 2014/0292699 A1* | 10/2014 | Ando .................... G06F 3/0414 |
| | | 345/173 |
| 2015/0135857 A1* | 5/2015 | Kawamura ............. G01L 1/225 |
| | | 73/862.045 |

FOREIGN PATENT DOCUMENTS

| | | |
|---|---|---|
| JP | 2000-337979 A | 12/2000 |
| JP | 2001-74768 A | 3/2001 |
| JP | 2009-53109 A | 3/2009 |
| WO | WO 2010/143528 A1 | 12/2010 |

OTHER PUBLICATIONS

Written Opinion of the International Searching Authority for PCT/JP2013/069709, date of mailing Aug. 20, 2013.

* cited by examiner

PRESSING FORCE SENSOR

CROSS REFERENCE TO RELATED APPLICATIONS

The present application is a continuation of International application No. PCT/JP2013/069709, filed Jul. 21, 2013, which claims priority to Japanese Patent Application No. 2012-165735, filed Jul. 26, 2012, the entire contents of each of which are incorporated herein by reference.

TECHNICAL FIELD

The present invention relates to a pressing force sensor, in particular to a pressing force sensor configured with a piezoelectric film or a resistor film.

BACKGROUND ART

As a pressing force sensor related to the present invention, there is exemplified a sensor described in Japanese Laid-Open Patent Publication. No. 2000-275114 (Patent Document 1). Patent Document 1 describes, for example, a pressing force sensor equipped with a piezoelectric element in which a piezoelectric crystal thin film is formed on each of both principal surfaces of a flexible substrate made of a metal thin plate, and electrode layers are formed on the piezoelectric crystal thin films. The electrode layers of the piezoelectric element are connected to an external circuit through electrode films disposed such that the piezoelectric element is held therebetween.

Patent Document 1 also describes an embodiment in which an electrode film also serves as a protective film. In the embodiment, there is used as the electrode film a film made of polyethylene terephthalate (PET) on which electrode patterns made of copper foil are formed, for example.

However, in the pressing force sensor described in Patent Document 1, if a solder reflow process is used to connect the sensor to an external circuit, heat resistance is problematic specifically with the electrode film. As described above, an electrode film made of, for example, PET cannot withstand solder reflow temperatures (260° C. or higher).

In order to address this issue, there can be considered, for example, a countermeasure in which a flexible printed circuit board is separately prepared for connection to an external circuit, and the flexible printed circuit board is connected to the electrode film through an anisotropic conductive film or an anisotropic conductive adhesive. However, this countermeasure requires high production cost.

PRIOR ART DOCUMENT

Patent Document

Patent Document 1: Japanese Laid-Open Patent Publication No, 2000-275114

SUMMARY OF THE INVENTION

Problem to be Solved by the Invention

In view of the above, an object of the present invention is to provide a pressing force sensor to which a solder reflow process can be applied for connection to an external circuit without any problem and which does not cause a rise in production cost.

Means for Solving the Problem

The present invention is directed to a pressing force sensor which includes a sensor element having pressing force detection electrodes, a lead terminal for connection to an external circuit, and a wiring conductor which connects the pressing force detection electrode and the lead terminal, and the present invention provides the following configuration to solve the above-described technical problem.

The pressing force sensor according to the present invention further includes a flexible printed circuit board having enough heat resistance to withstand solder reflow temperatures. The above-described pressing force detection electrodes, lead terminal, and wiring conductor are disposed on the flexible printed circuit board, and in particular, at least the pressing force detection electrodes and the wiring conductor are disposed on a first principal surface of the flexible printed circuit board. The flexible printed circuit board is folded via a folding line such that the first principal surface faces inward and such that the sensor element is held by the flexible printed circuit board; thus, the sensor element is deflected by a pressing force applied to a second principal surface which faces outward, in a first area located on one side of the folded flexible printed circuit board with respect to the folding line, whereby a signal corresponding to the pressing force is taken out from the pressing force detection electrodes.

A pressing force sensor having the above-described configuration includes a flexible printed circuit board having enough heat resistance to withstand solder reflow temperatures; thus, when a lead terminal for external connection is provided on the flexible printed circuit board, solder reflow process can be applied for connection to an external circuit without any problem, for example. In addition, because the pressing force detection electrode, the lead terminal, and the wiring conductor can be formed on the flexible printed circuit boar, it is possible to reduce the number of components and the number of manufacturing steps, and as a result, it is possible to reduce the production cost of the pressing force sensor.

The second principal surface, which faces outward in the folded state of the flexible printed circuit board, can be used for any purpose and can be used to form, for example, a shield electrode thereon, if necessary. If the shield electrode is formed as described above, the shield electrode can function as a shield layer when the shield electrode is connected to the ground or the like. Therefore, there is no need for providing an electrostatic countermeasure such as a shield tape or a shield film attached on the outside of the pressing force sensor.

It is preferable to prepare a support body having a recessed portion or a hole which allows the sensor element to be deflected by a pressing force. The support body is disposed along the second principal surface in a second area of the folded flexible printed circuit board which is on the opposite side to the first area with respect to the folding line. When the pressing force sensor is further equipped with the support body in this manner, the sensor element can be deflected surely and easily by a pressing operation.

According to a first aspect, the sensor element includes a piezoelectric film, and the pressing force detection electrodes are each disposed to be in contact with a corresponding one of both principal surfaces of the piezoelectric film. According to the aspect of the embodiment, there is provided an advantage that it is possible to simultaneously form the pressing force detection electrodes, each of which is in contact with a corresponding one of both principal surfaces of the piezoelectric film, on the first principal surface of the flexible printed circuit board.

In the above-described first aspect, a plurality of sensor elements may be provided, and the plurality of sensor elements may be disposed to be distributed at a plurality of positions in a principal surface direction of the one piezoelectric film. With this arrangement, one pressing force sensor can be provided with a plurality of pressing operation parts.

Further, in the first aspect, it is preferable that the piezoelectric film is made of a polylactic acid member stretched in a predetermined direction.

It is preferable that the pressing force sensor of the first aspect is more specifically configured as described below.

The sensor element includes a piezoelectric film made of a polylactic acid member stretched in a predetermined direction. The pressing force sensor includes a plurality of sensor elements, and the plurality of sensor elements are disposed to be distributed at a plurality of positions in the principal surface direction of the one piezoelectric film. The pressing force detection electrodes are each disposed in contact with a corresponding principal surface of the piezoelectric film, at the positions at which the plurality of sensor elements are disposed, and a plurality of slits are provided in the piezoelectric film and the flexible printed circuit board to define a deflection area of each of the plurality of sensor elements.

The plurality of slits preferably extend mutually in the same direction. Thus, strain can be created, by a pressing operation, in the same direction in each of the plurality of sensor elements, whereby electric charges of the same polarity can be taken out from the pressing force detection electrodes.

In the above preferred configuration, it is more preferable that the stretching direction of the polylactic acid member constituting the piezoelectric film and the direction in which the slits extend make an angle of 45°±10°. That is because the piezoelectric effect due to a pressing operation can thus be most effectively obtained.

According to a second aspect, the sensor element includes a resistor film, and the pressing force detection electrodes are each electrically connected to a corresponding end of the resistor film. In this case, the folded flexible printed circuit board functions as at least a protective cover for the resistor film.

Effect of the Invention

Because the pressing force sensor according to the present invention includes a flexible printed circuit board having enough heat resistance to withstand solder reflow temperatures, and because a lead terminal for connection to the outside can be provided on the flexible printed circuit board, a solder reflow process can be applied to make a connection to an external circuit, for example, without any problem. Therefore, there is no need for complicated work such as connecting a separately prepared flexible printed circuit board by using an anisotropic conductive film or the like.

In addition, the flexible printed circuit board is folded, via the folding line, to hold the sensor element therebetween, and because the pressing force detection electrodes, the lead terminal, and the wiring conductor can be formed on the flexible printed circuit board, it is possible to reduce the number of components and the number of manufacturing steps, and as a result, it is possible to reduce the production cost of the pressing force sensor.

Further, at any position on the flexible printed circuit board, there can be directly mounted a necessary electronic component, switch, or other components by a solder reflow process.

Further, it is easy to change the position or number of pressing force detection electrodes formed on the flexible printed circuit board or to change the pattern of the wiring conductor, and by making such a change, it is easy to change the design such as the position or number of sensor elements.

MODE FOR CARRYING OUT THE INVENTION

First Embodiment

With reference to FIG. 1 to FIG. 6, a pressing force sensor 1 according to a first embodiment will be described. Note that, in FIG. 1 and FIG. 2, the dimensions in thickness directions of the components shown in the figures are exaggeratedly illustrated.

Figure 1:
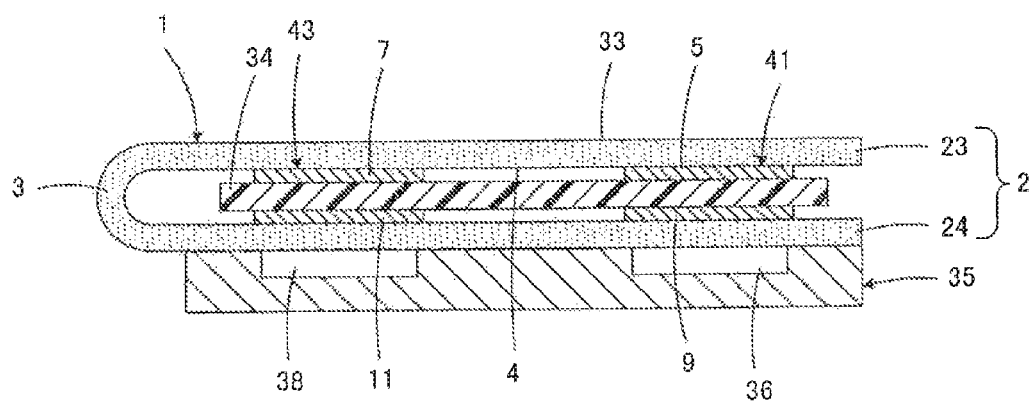
FIG. 1 is a sectional view showing a pressing force sensor 1 according to a first embodiment of the present invention, together with a support body 35.
Figure 2:
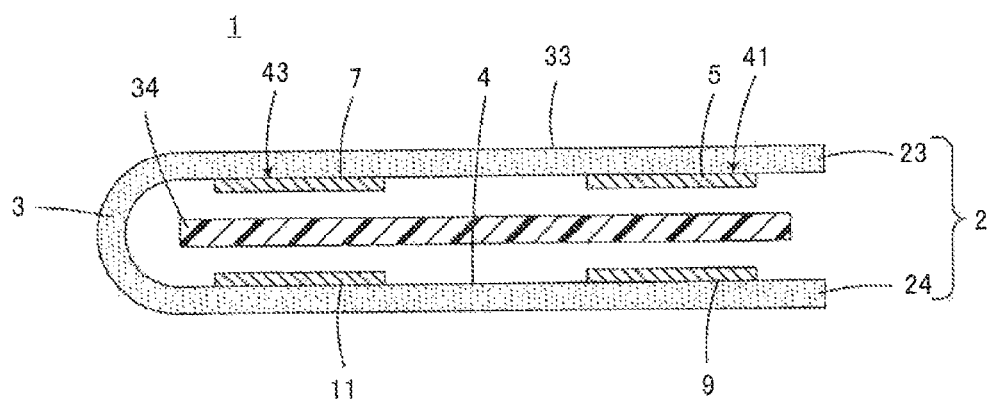
FIG. 2 is a sectional view showing the pressing force sensor 1 shown in FIG. 1 in a disassembled state.

A pressing force sensor 1 is equipped with a flexible printed circuit board 2 having enough heat resistance to withstand solder reflow temperatures. Commercially available flexible printed circuit boards are made of, for example, polyimide and have enough heat resistance to withstand solder reflow temperatures. In the pressing force sensor 1, the flexible printed circuit board 2 is used while being folded via a predetermined folding line 3 as shown in FIG. 1 and FIG. 2.

Figure 3:
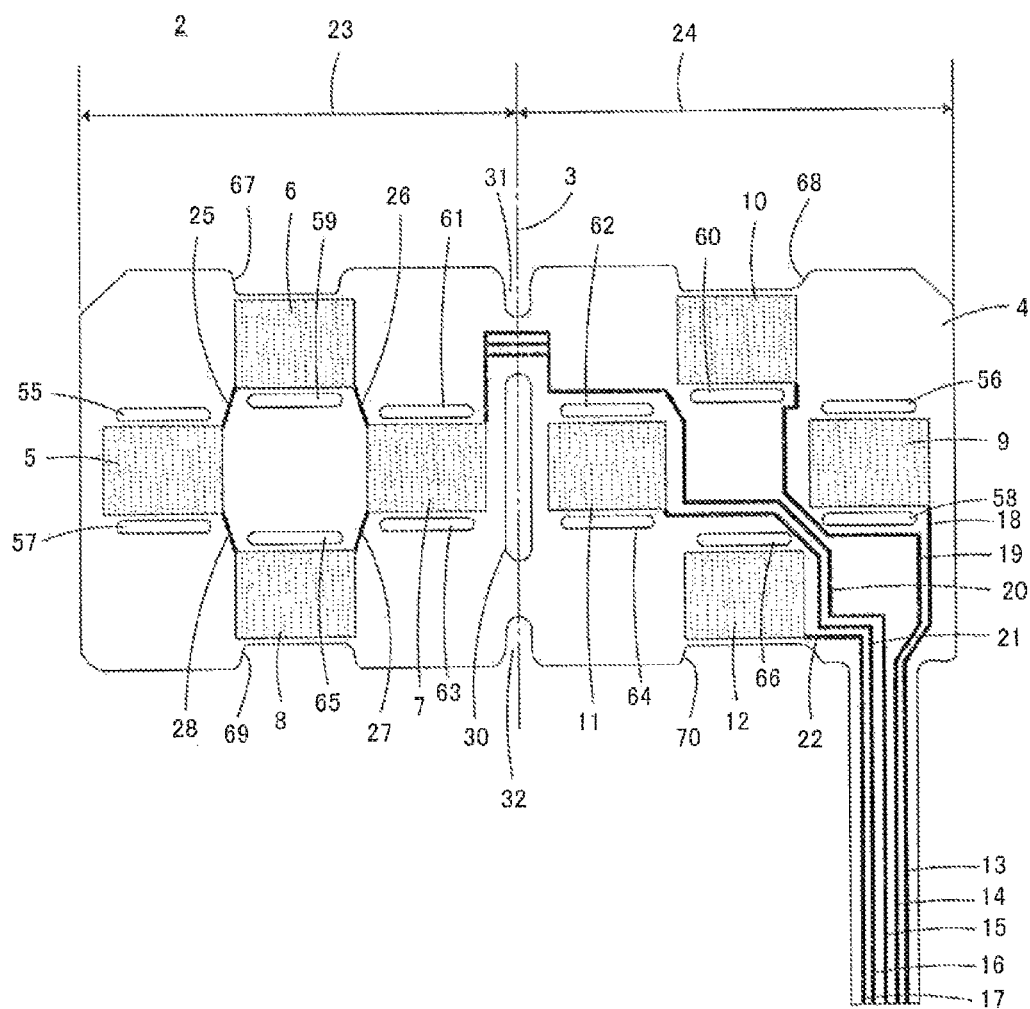
FIG. 3 is a plan view showing a flexible printed circuit board 2 shown in FIG. 1 and FIG. 2, in an exploded state.

On a first principal surface 4 of the flexible printed circuit board 2, which faces inward when folded, there are formed, as well illustrated in FIG. 3, eight pressing force detection electrodes 5 to 12, five lead terminals 13 to 17 for connection to an external circuit, and five wiring conductors 18 to 22 which connect the pressing force detection electrodes 5 to 12 and the lead terminals 13 to 17. Although not shown in the figure, it is preferable that an electrically insulating resist film covers the area which is on the first principal surface 4 of the flexible printed circuit board 2 except the area on which the pressing force detection electrodes 5 to 12 are formed.

Of the eight pressing force detection electrodes 5 to 12, the pressing force detection electrodes 5 to 8 are located in a first area 23 on one side of the flexible printed circuit board 2 with respect to the folding line 3, and the pressing force detection electrodes 9 to 12 are located in a second area 24 on the other side with respect to the folding line 3. When the flexible printed circuit board 2 is folded, the pressing force detection electrodes 5, 6, 7, and 8 face the pressing force detection electrodes 9, 10, 11, and 12, respectively. The pressing force detection electrodes 5, 6, 7, and 8 are connected to each other through connecting conductors 25, 26, 27, and 28 between the neighboring electrodes. Therefore, the pressing force detection electrodes 5 to 8 may be integrally formed as one electrode.

The pressing force detection electrodes 5 to 12, the lead terminals 13 to 17, the wiring conductors 18 to 22, and the connecting conductors 25 to 28 are configured with, for example, a conductor film in which Pt foil, Cu foil, an. Ni plating film, and an Au plating film are formed, one on top of the other.

Figure 4:
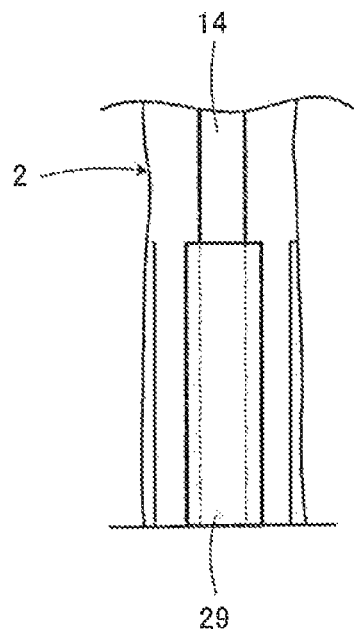
FIG. 4 is an enlarged plan view showing a part of the flexible printed circuit board 2 shown in FIG. 3, in which part a lead terminal 14 is provided.

In particular, with respect to the end parts of the lead terminals 13 to 17, protective films 29 made of carbon paste may be formed so as to cover each end part of the lead terminals 13 to 17 as shown in FIG. 4 where the lead terminal 14 is enlarged. This is for protecting the lead terminals 13 to 17 from mechanical wear if the lead terminals 13 to 17 are used to be connected to a connector (not shown).

In the flexible printed circuit board 2, there are preferably provided a slit 30 and notches 31 and 32 for easy folding via the folding line 3. Note that the slit 30 is not shown in FIG. 1 or FIG. 2. Further, on the part of the wiring conductor 20 which steps over the folding line 3, there are formed, for example, three parallel lines to reduce the possibility of the folding line 3 to break due to folding.

In the pressing force sensor 1, a pressing force is applied in the direction toward a second principal surface 33 which faces outward, in the first area 23 of the folded flexible printed circuit board 2. This pressing force deflects the sensor elements 41 to 44 made of a piezoelectric film 34 to be described later, and a signal is thus taken out corresponding to the pressing force from the pressing force detection electrodes 5 to 12. In order for such deflection of the sensor elements 41 to 44 to be easily and surely caused, there is disposed a support body 35, as shown in FIG. 1, along the second principal surface 33, which faces outward, in the second area 24 of the folded flexible printed circuit board 2. The support body 35 is attached on the flexible printed circuit board 2 with, for example, an adhesive.

Figure 5:
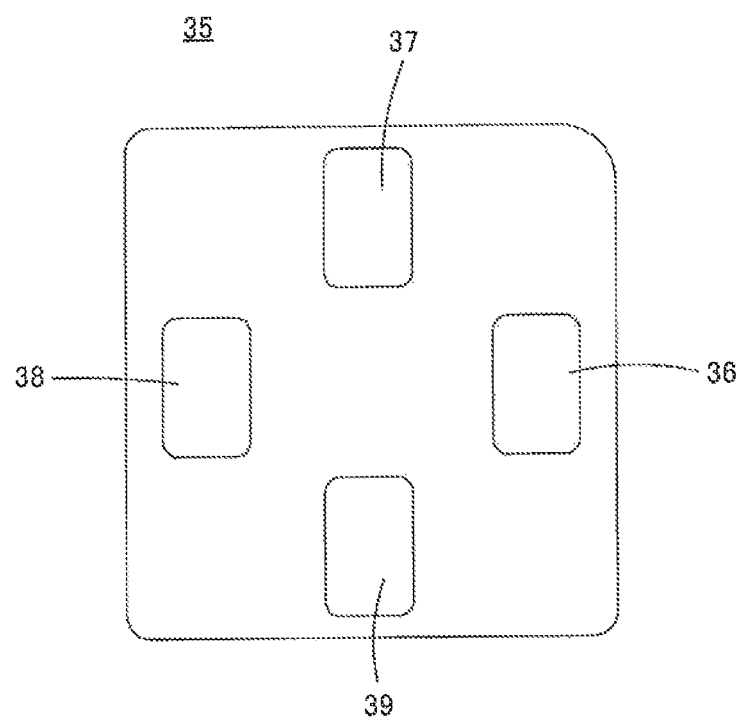
FIG. 5 is a plan view of a support body 35 shown in FIG. 1.

The support body 35 has, as shown in FIG. 5, recessed portions 36 to 39 which allow the sensor elements 41 to 44 to be deflected by the above-mentioned pressing force. The recessed portion 36 is located corresponding to the position of the above-described pressing force detection electrodes 5 and 9, the recessed portion 37 is located corresponding to the position of the pressing force detection electrodes 6 and 10, the recessed portion 38 is located corresponding to the position of the pressing force detection electrodes 7 and 11, and the recessed portion 39 is located corresponding to the position of the pressing force detection electrodes 8 and 12. The recessed portions 36 to 39 may be replaced by holes passing through the support body 35.

As shown in FIG. 1 and FIG. 2, the piezoelectric film 34 is disposed to be held between the first area 23 and the second area 24 of the folded flexible printed circuit board 2. This state is fixed with, for example, an adhesive. The pressing force detection electrodes 5 to 8 and the pressing force detection electrodes 9 to 12 are each in contact with a corresponding principal surface of the piezoelectric film 34.

If the pressing force detection electrodes 5 to 8 and the Dressing force detection electrodes 9 to 12 are each formed directly on a corresponding principal surface of the piezoelectric film 34, it is normally necessary to separately perform the step of forming the pressing force detection electrodes 5 to 8 and the step of forming the pressing force detection electrodes 9 to 12. However, in the case of the present embodiment, after the pressing force detection electrodes 5 to 8 and the pressing force detection electrodes 9 to 12 are simultaneously formed on the first principal surface 4 of the flexible printed circuit board 2, the flexible printed circuit board 2 is folded while holding the piezoelectric film 34 therebetween, and thus, the pressing force detection electrodes 5 to 8 and the pressing force detection electrodes 9 to 12 are each made in contact with a corresponding principal surface of the piezoelectric film 34. Therefore, it is possible to improve the efficiency of the step for forming the pressing force detection electrodes 5 to 12.

Figure 6:
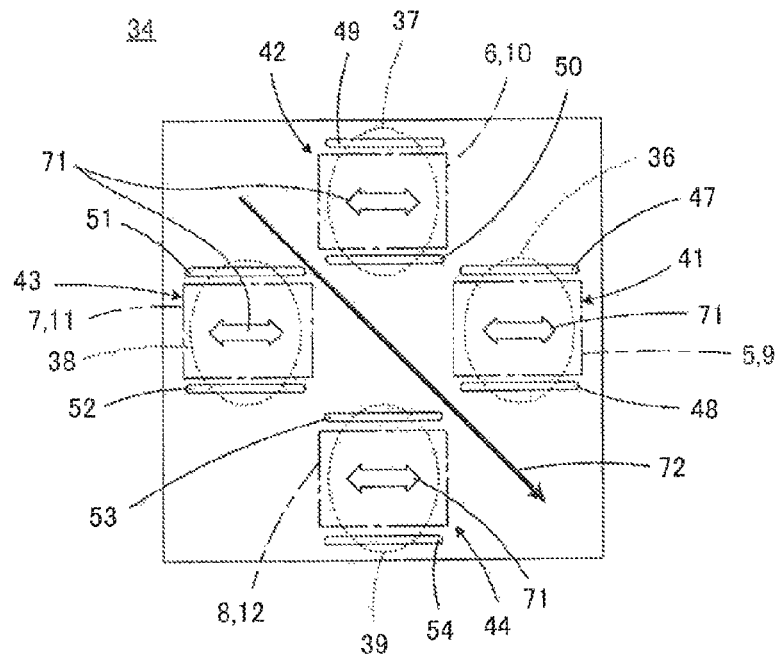
FIG. 6 is a plan view of a piezoelectric film 34 shown in FIG. 1 and FIG. 2.

FIG. 6 shows, in a plan view, the piezoelectric film 34, on which the pressing force detection electrodes 5 to 12 formed on the flexible printed circuit board 2 are illustrated by the dashed lines. Further, FIG. 6 illustrates, by dotted lines, the positions of the recessed portions 36 to 39 provided on the support body 35.

The mutually facing pressing force detection electrodes 5 and 9 and a part of the piezoelectric film 4 located therebetween constitute a first sensor element 41. The mutually facing pressing force detection electrodes 6 and 10 and a part of the piezoelectric film 34 located therebetween constitute a second sensor element 42. The mutually facing pressing force detection electrodes 7 and 11 and a part of the piezoelectric film 34 located therebetween constitute a third sensor element 43. The mutually facing pressing force detection electrodes 8 and 12 and a part of the piezoelectric film 34 located therebetween constitute a fourth sensor element 44. In this manner, the plurality of sensor elements 41 to 44 are disposed to be distributed at a plurality of positions in the principal surface direction of the one piezoelectric film 34.

However, as another embodiment, separate piezoelectric films may be used for each of the first to fourth sensor elements 41 to 44.

The piezoelectric film 34 can be made of, for example, a polymer such as polylactic acid or polyvinylidene fluoride; however, the piezoelectric film 34 is preferably made of polylactic acid because polylactic acid exhibits piezoelectricity only by stretching and polarization treatment is not required. In addition, polylactic acid is not pyroelectric, and thus polylactic acid is not affected by temperature. Polylactic acid has two types, L-type polylactic acid (PLLA) and D-type polylactic acid (PDLA), and PLLA is preferably used for easy availability.

As shown in FIG. 6, the piezoelectric film 34 has slits 47 and 48 provided to define a deflection area of the first sensor element 41. In the same manner, slits 49 and 50 are provided for the second sensor element 42, slits 51 and 52 are provided for the third sensor element 43, and slits 53 and 54 are provided for the fourth sensor element 44.

On the other hand, as shown in FIG. 3, the flexible printed circuit board 2 also has slits or notches at the positions communicating with above-mentioned respective slits 47 to 54. In a more detailed description, there are provided in the flexible printed circuit board 2 slits 55 and 56 communicating with the slit 47, slits 57 and 58 communicating with the slit 48, notches 67 and 68 communicating with the slit 49, slits 59 and 60 communicating with the slit 50, slits 61 and 62 communicating with the slit 51, slits 63 and 64 communicating with the slit 52, slits 65 and 66 communicating with the slit 53, and notches 69 and 70 communicating with slit 54.

The above-described slits 47 to 54, slits 55 to 66, and notches 67 to 70 extend mutually in the same direction. Thus, due to these slits 47 to 54, slits 55 to 66, and notches 67 to 70, when a pressing operation is performed, the sensor elements 41 to 44 are strained mutually in the same direction indicated by double-headed arrows 71 in FIG. 6. Therefore, it is possible to make the signals obtained from each of the sensor elements 41 to 44 have the same polarity.

In addition, the slits 47 to 54, the slits 55 to 66, and the notches 67 to 70 can allow strain to be created in a good balance between each of the sensor elements 41 to 44, and can thus contribute to a good balance between generation of charge and, stress. Further, the slits 47 to 54, the slits 55 to 66, and the notches 67 to 70 can contribute to controlling the deterioration, caused by stretching, of the piezoelectric film 34 and the flexible printed circuit board 2 due to repeated loading.

Note that the slits 47 to 54 and the slits 55 to 66 may be made of simple slits having no width.

When the piezoelectric film 34 is made of PLLA, a stretching direction. 72 of the PLLA is shown by an arrow in FIG. 6. As can be understood from FIG. 6, the stretching direction 72 of the PLLA and the slits 47 to 54 make an angle of approximately 45°. With this arrangement, the stretching direction 72 and a strain direction 71 intersect at an angle of approximately 45°. Such an angle makes it possible to most efficiently obtain the piezoelectric effect due to pressing operations. Note that, even if the angle at which the stretching direction 72 of the PLLA and the slits 47 to 54 intersect is varied in the range of ±10° from 45°, it is possible to obtain the piezoelectric effect which is substantially as efficient as in the case of 45°.

In the pressing force sensor 1, the sensor elements 41 to 44 are deflected by a pressing force applied to the second principal surface 33, which faces outward, in the first area 23 located on one side of the folding line 3 of the folded flexible printed circuit board 2, and thus, a signal corresponding to the above-mentioned pressing force is taken out from the pressing force detection electrodes 5 to 12. By detecting from which of the pressing force detection electrodes 5 to 12 the signal is taken out, it is possible to see on which of the sensor elements 41 to 44 the pressing operation is performed. Further, based on the strength of the signal taken out, it is possible to detect a push-in amount of the pressing operation.

Second Embodiment

Figure 7:
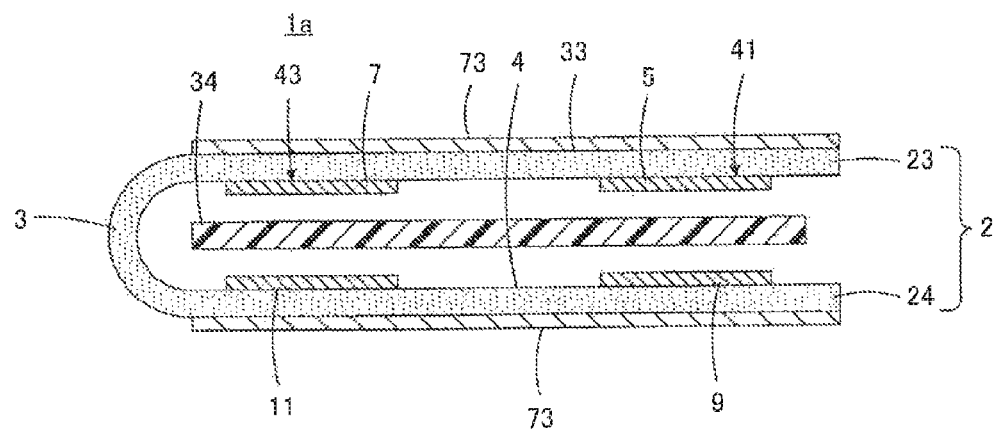
FIG. 7 is a sectional view of a pressing force sensor 1a according to a second embodiment of the present invention, in a disassembled state.

With reference to FIG. 7, a pressing force sensor 1a according to a second embodiment will be described. FIG. 7 is a figure corresponding to FIG. 2. In FIG. 7, components corresponding to the components shown in FIG. 2 are assigned the same reference symbols, and will not be described again.

As can be understood from the comparison between FIG. 7 and FIG. 2, the pressing force sensor 1a shown in FIG. 7 is characterized in that the pressing force sensor 1a is further equipped with a shield electrode 73 formed on the second principal surface 33 of the flexible printed circuit board 2. This shield electrode 73 can function, for example, as a shield layer for electrostatic countermeasure when the shield electrode 73 is connected to the ground or the like.

In FIG. 7, the shield electrode 73 is formed on the flexible printed circuit board 2 except the folding line 3; however, the shield electrode 73 may be formed on the entire surface of the second principal surface 33 of the flexible printed circuit board 2.

Also on the pressing force sensor 1a shown in FIG. 7, the support body 35 shown in FIG. 1 may be attached if necessary. This is the same as in the third and following embodiments to be described below.

Third Embodiment

Figure 8:
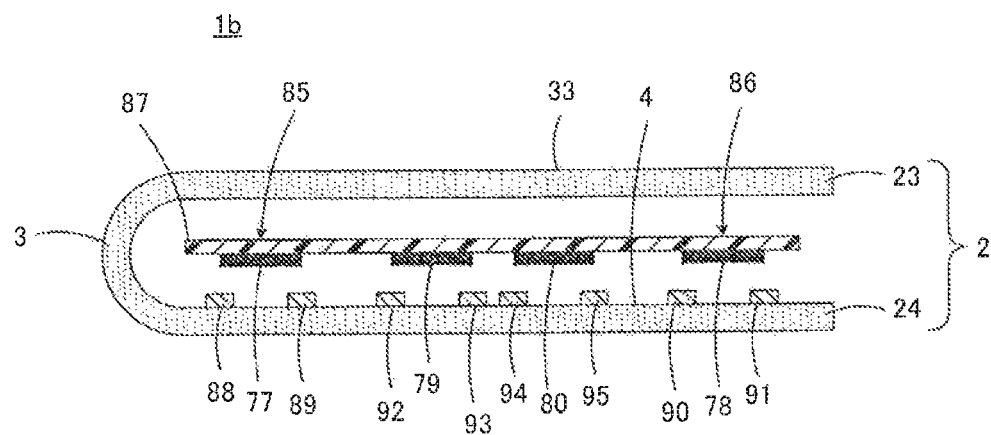
FIG. 8 is a sectional view of a pressing force sensor 1b according to a third embodiment of the present invention, in a disassembled state.

With reference to FIG. 8, a pressing force sensor 1b according to the third embodiment will be described. FIG. 8 is a figure corresponding to FIG. 2. In FIG. 8, components corresponding to the components shown in FIG. 2 are assigned the same reference symbols, and will not be described again.

Figure 9:
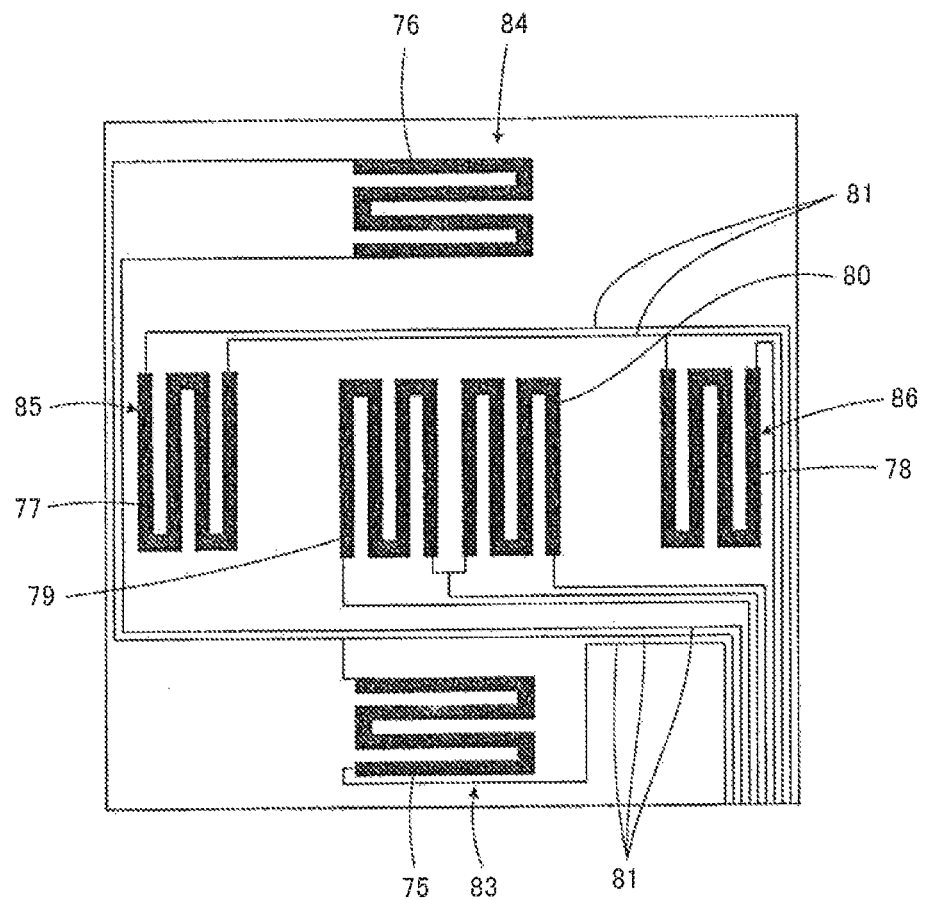
FIG. 9 is a plan view for describing the arrangement of resistor films 75 to 80 shown in FIG. 8.

The pressing force sensor 1b shown in FIG. 8 is characterized in that a sensor element is configured not with a piezoelectric film but with resistor films. FIG. 9 shows an example of an arrangement of the resistor films it a plan view.

With reference to FIG. 9, there are shown six resistor films 75 to 80 each having a meander shape. These resistor films 75 to 80 are formed by, for example, printing carbon paste. With reference to FIG. 9, various lines 81 connected to resistor films 75 to 80 represent electric wiring from the pressing force detection electrodes to the lead terminals. The resistor films 75 to 80 constitute a bridge circuit, where the resistor films 75, 76, 79, and 80 constitute a first bridge and the resistor films 77, 78, 79, and 80 constitute a second bridge. Here, the resistor films 75, 76, 77, and 78 form first to fourth sensor elements 83, 84, 85, and 86, respectively.

With reference to FIG. 8 again, there is disposed an insulating film 87 held between a first area 23 and a second area 24 of a folded flexible printed circuit board 2, and this state is fixed with, for example, an adhesive. On one principal surface of the insulating film 87, the above described resistor films 75 to 80 are formed in the arrangement shown in FIG. 9. FIG. 8 shows only the resistor films 77 to 80.

On the other hand, on a first principal surface 4 in the second area 24 of the flexible printed circuit board 2, there are formed pressing force detection electrodes, wiring conductors, and lead terminals, which correspond to the lines 81 shown in FIG. 9. FIG. 8 shows pressing force detection electrodes 88 and 89 to be in contact with the both ends of the resistor film 77, pressing force detection electrodes 90 and 91 to be in contact with the both ends of the resistor film 78, pressing force detection electrodes 92 and 93 to be in contact with the both ends of the resistor film 79, and pressing force detection electrodes 94 and 95 to be in contact with the both ends of the resistor film 80.

As can be understood from the above description, it should be understood that FIG. 9 illustrates only the arrangement of the resistor films 75 to 80. In other words, in the present embodiment, the resistor films 75 to 80 shown in FIG. 9 are formed on the insulating film 87, but the various lines 81 shown in FIG. 9 are formed not on the insulating film 87 but on the flexible printed circuit board 2.

In the pressing force sensor 1b, any one of the sensor elements 83 to 86, which are configured with the resistor films 75 to 78, respectively, is deflected by a pressing force applied to the second principal surface 33, which faces outward, in the first area 23 located on one side of the folding line 3 of the folded flexible printed circuit board 2; thus, signals corresponding to the above-mentioned pressing force are taken out from a plurality of pressing force detection electrodes including, the pressing force detection electrodes 88 to 95.

Fourth Embodiment

Figure 10:
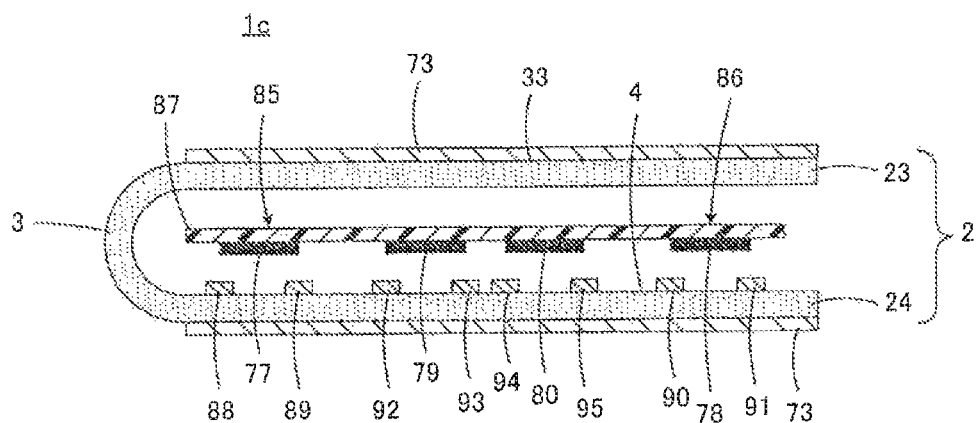
FIG. 10 is a sectional view showing a pressing force sensor 1c according to a fourth embodiment of the present invention, in a disassembled state.

With reference to FIG. 10, a pressing force sensor 1c according to a fourth embodiment will be described. FIG. 10 is a figure corresponding to FIG. 8. In FIG. 10, components corresponding to the components shown in FIG. 8 are assigned the same reference symbols, and will not be described again.

As can be understood from the comparison between FIG. 10 and FIG. 8, the pressing force sensor 1c shown in FIG. 10 is, similarly to the case of the pressing force sensor 1a shown in FIG. 7, characterized in that the pressing force sensor 1c is further equipped with a shield electrode 73 formed on a second principal surface 33 of a flexible printed circuit board 2.

Fifth Embodiment

Figure 11:
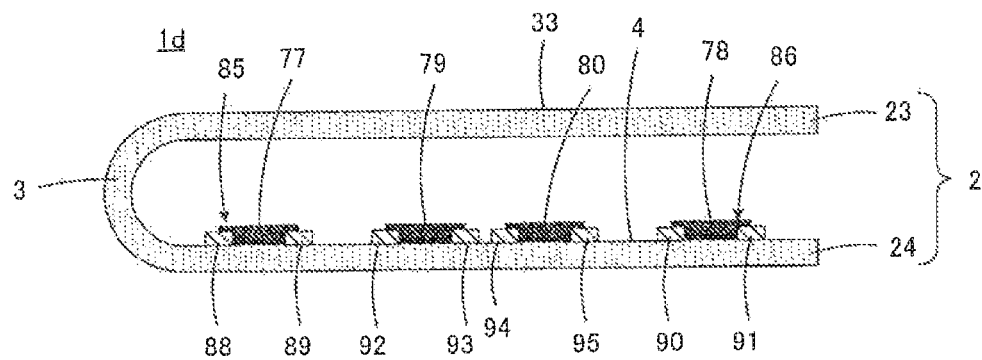
FIG. 11 is a sectional view showing a pressing force sensor 1d according to a fifth embodiment of the present invention, in a disassembled state.

With reference to FIG. 11, a pressing force sensor 1d according to a fifth embodiment will be described. FIG. 11 is a figure corresponding to FIG. 8. In FIG. 10, components corresponding to the components shown in FIG. 8 are assigned the same reference symbols, and will not be described again.

The pressing force sensor 1d shown in FIG. 11 is characterized in that such resistor films 75 to 80 as shown in FIG. 9 are formed, together with electric wiring from the pressing force detection electrodes to the lead terminals, on a first principal surface 4 in a second area 24 of the flexible printed circuit board 2. FIG. 11 shows the resistor films 77 to 80 and the pressing force detection electrodes 88 to 95. The first area 23 and the second area 24 of the folded flexible printed circuit board. 2 are bonded with each other with, for example, an adhesive.

In the pressing force sensor 1d shown in FIG. 11, the first area 23 of the flexible printed circuit board 2 entirely functions as a protective layer.

Sixth Embodiment

Figure 12:
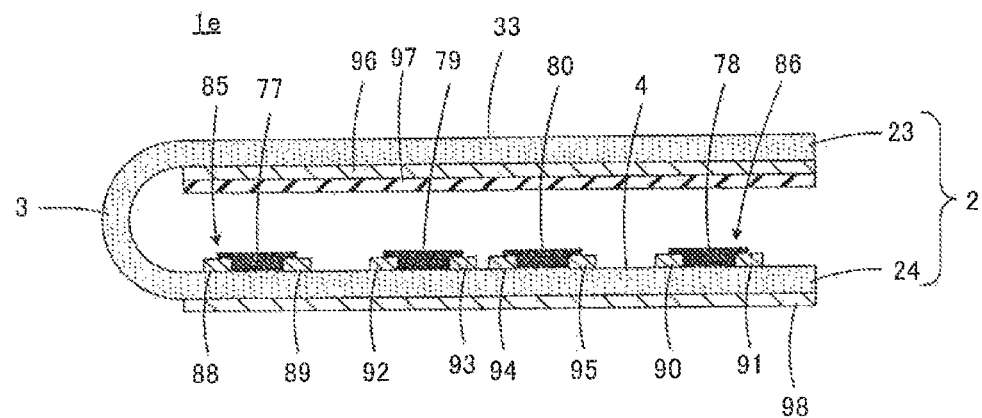
FIG. 12 is a sectional view showing a pressing force sensor 1e according to a sixth embodiment of the present invention, in a disassembled state.

With reference to FIG. 12, a pressing force sensor 1e according to a sixth embodiment will be described. FIG. 12 is a figure corresponding to FIG. 11. In FIG. 12, components corresponding to the components shown in FIG. 11 are assigned the same reference symbols, and will not be described again.

As can be understood from the comparison between FIG. 12 and FIG. 11, the pressing force sensor 1e shown in FIG. 12 is characterized in the following configuration: a shield electrode 96 is formed on a first principal surface 4 in the first area 23 of the flexible printed circuit board 2; an electrically insulating resist layer 97 is formed to cover the shield electrode 96; and a shield layer 98 is formed on a second principal surface 33 in a second area 24.

The pressing force sensors according to the above-described first to sixth embodiments are equipped with four sensor elements; however, the pressing force sensor according to the present invention may include any number of sensor elements. For example, the pressing force sensor may include just one sensor element as the pressing force sensor according to seventh and eighth embodiments to be described below.

Seventh Embodiment

Figure 13:
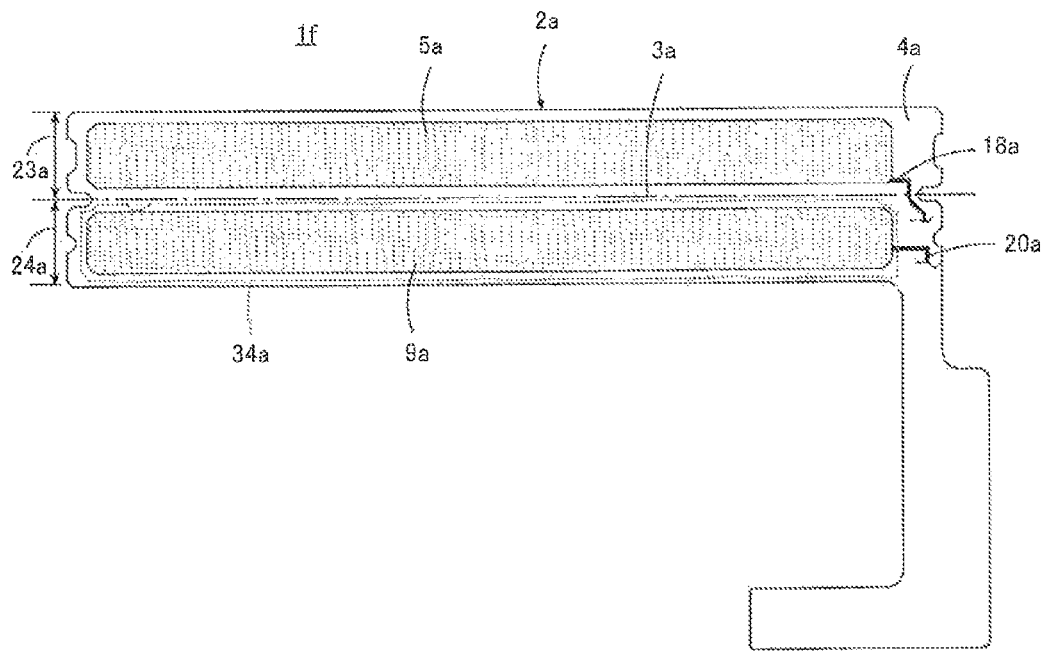
FIG. 13 is a view for describing a pressing force sensor if according to a seventh embodiment of the present invention and is a plan view showing a flexible printed circuit board 2a in an exploded state.

With reference to FIG. 13, a pressing force sensor 1f according to the seventh embodiment will be described.

The pressing force sensor 1f includes a flexible printed circuit board 2a. The flexible printed circuit board 2a is used while being folded via a folding line 3a illustrated by a dashed line.

On a first principal surface 4a which faces inward in the folded state of the flexible printed circuit board 2a, there are formed two pressing force detection electrodes 5a and 9a. To the pressing force detection electrodes 5a and 9a are connected wiring conductors 18a and 20a, respectively, which are led to lead terminals (not shown). Note that the not-shown lead terminals may be disposed not on the first principal surface 4a of the flexible printed circuit board 2a but on a second principal surface opposite to the first principal surface 4a. In this case, a part of each of the wiring conductors 18a and 20a is disposed such that the part passes through the flexible printed, circuit board 2a in the thickness direction.

Of the two pressing force detection electrodes 5a and 9a, the pressing force detection electrode 5a is located in a first area 23a which is one side of the flexible printed circuit board 2a with respect to the folding line 3a, and the pressing force detection electrode 9a is located in a second area 24a which is the other side with respect to the folding line 3a. In the folded state of the flexible printed circuit board 2a, the pressing force detection electrode 5a faces the pressing force detection electrode 9a.

In the flexible printed circuit board 2a, there may be provided a slit, which is not shown in the figure, along the folding line 3a for easy folding via the folding line 3a.

As illustrated by a dotted line in FIG. 13, a piezoelectric film 34a is disposed to be held between the first area 23a and the second area 24a of the folded flexible printed circuit board 2a. This state is fixed with, for example, an adhesive. To each principal surface of the piezoelectric film 34a is connected a corresponding one of the pressing force detection electrode 5a and the pressing force detection electrode 9a. The piezoelectric film 34a is preferably made of polylactic acid.

Eighth Embodiment

Figure 14:
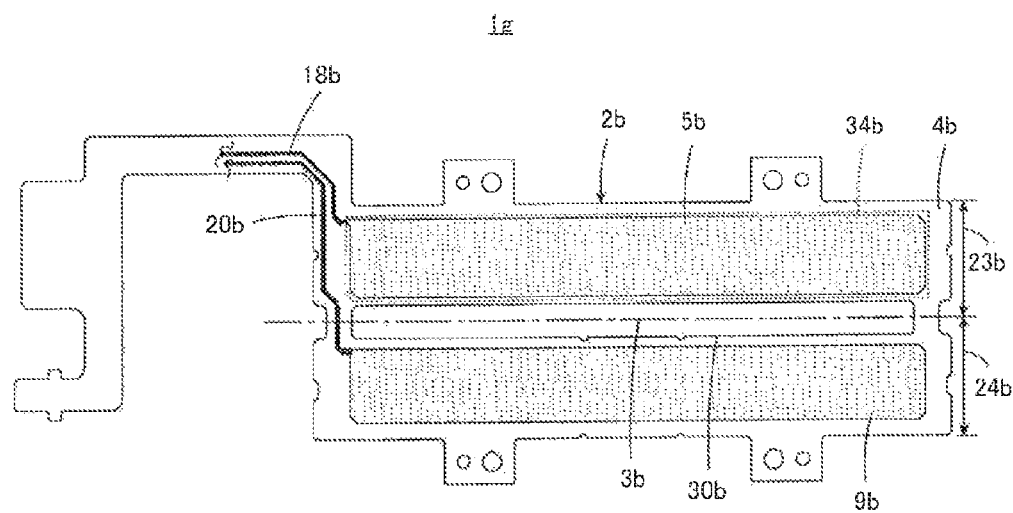
FIG. 14 is a view for describing a pressing force sensor 1g according to an eighth embodiment of the present invention and is a plan view showing a flexible printed circuit board 2b in an exploded state.

With reference to FIG. 14, a pressing force sensor 1g according to the eighth embodiment will be described. FIG. 14 is a figure corresponding to FIG. 13.

A flexible printed circuit board 2b equipped in the pressing force sensor 1g has a different shape from the flexible printed circuit board 2a shown in FIG. 13. The flexible printed circuit board 2b is used while being folded via the folding line 3b illustrated by a dashed line.

A pressing force detection electrode 5b is formed in a first area 23b which is one side of the flexible printed circuit board 2b with respect to a folding line 3b and which is on a first principal surface 4b which faces inward in the folded state. On the other hand, a pressing force detection electrode 9b is formed in a second area 24b which is the other side of the flexible printed circuit board 2b with respect to the folding line 3b and which is on the first principal surface 4b, which faces inward in the folded state. Therefore, in the folded state of the flexible printed circuit board 2a, the pressing force detection electrode 5b faces the pressing force detection electrode 9b.

To the pressing force detection electrodes 5b and 9b are connected wiring conductors 18b and 20b, respectively, which are led to lead terminals (not shown).

In the flexible printed circuit board 2b, there is provided a slit 30b along the folding line 3a for easy folding via the folding line 3b.

As illustrated by a dotted line in FIG. 14, a piezoelectric film 34b is disposed to be held between the first area 23b and the second area 24b of the folded flexible printed circuit board 2b. This state is fixed with, for example, an adhesive. With each principal surface of the piezoelectric film 34b, a corresponding one of the pressing force detection electrode 5b and the pressing force detection electrode 9b is in contact. The piezoelectric film 34b is preferably made of polylactic acid.

Although there is no specific description, some configurations employed in the first to sixth embodiments can be appropriately employed also in the seventh and eighth embodiments.

DESCRIPTION OF REFERENCE SYMBOLS 1, 1a, 1b, 1c, 1d, 1e, 1f, 1g Pressing force sensor
2, 2a, 2b Flexible printed circuit board
3, 3a, 3b Folding line
4, 4a, 4b First principal surface
5 to 12, 88 to 95, 5a, 5b, 9a, 9b Pressing force detection electrode
13 to 17 Lead terminal
18 to 22, 18a, 18b, 20a, 20b Wiring conductor
23, 23a, 23b First area
24, 24a, 24b Second area
33 Second principal surface
34, 34a, 34b Piezoelectric film
35 Support body
36 to 39 Recessed portion
41 to 44, 83 to 86 Sensor element
47 to 54, 55 to 66 Slit
71 Strain direction.
72 Stretching direction
73, 96, 98 Shield electrode
75 to 80 Resistor film
87 Insulating film

The invention claimed is:

1. A pressing force detector, comprising:
   a flexible printed circuit board having a folding line dividing the circuit board into first and second areas, the circuit board having first and second principal surfaces and being folded back on itself so that the portion of the first principal surface corresponding to the first area faces the portion of the first principal surface corresponding to the second area;
   a plurality of pressing force electrodes located on the first principal surface so that respective pairs of pressing force electrodes face one another;
   a single piezoelectric element extending between each respective pair of pressing force electrodes, whereby each pair of pressing force electrodes cooperate with the portion of the piezoelectric element extending between them to form a respective sensor element.

2. The pressing force sensor of claim 1, further comprising a shield electrode formed on the second principal surface of the flexible printed circuit board.

3. The pressing force detector of claim 1, wherein the single piezoelectric element is a piezoelectric sheet.

4. The pressing force sensor of claim 1, wherein the pressing force detection electrodes are each in contact with a corresponding principal surface of the piezoelectric film.

5. The pressing force sensor of claim 4, wherein the plurality of sensor elements are disposed to be distributed at a plurality of positions in a principal surface direction of the piezoelectric film.

6. The pressing force sensor of claim 4, wherein the piezoelectric film is made of a polylactic acid member stretched in a predetermined direction.

7. The pressing force detector of claim 1, wherein the piezoelectric element has respective sets of slits formed around each respective sensor element.

8. The pressing force detector of claim 7, the circuit board has respective sets of slits formed around each respective sensor element, each respective set of slits in the circuit board aligning with a corresponding set of slit in the piezoelectric element.

9. The pressing force sensor of claim 8, wherein the plurality of slits extend in the same direction.

10. The pressing force sensor of claim 9, wherein the piezoelectric film is made of a polylactic acid member stretched in a stretching direction and the slits extend at an angle of 45°±10° relative to the stretching direction.

11. The pressing force sensor of claim 1, wherein the sensor element further includes a resistor film, and the pressing force detection electrodes are each electrically connected to a corresponding end of the resistor film.

12. The pressing force detector of claim 1, further comprising a lead terminal for connection to an external circuit and wiring conductors connecting respective sensor elements to the lead terminal.

13. The pressing force detector of claim 12, wherein the circuit board has sufficient heat resistance to withstand solder reflow temperatures.

14. The pressing force detector of claim 7, further comprising a support body which supports the circuit board, the support body having respective recesses below respective sensor elements so that when a downward force is applied to the second principal surface of the circuit board at a location corresponding to one of the sensor elements, the sensor element is free to move down into the respective recess.

* * * * *